US011159432B2

(12) United States Patent
Chen et al.

(10) Patent No.: US 11,159,432 B2
(45) Date of Patent: Oct. 26, 2021

(54) DATA TRANSMISSION METHOD, AND SWITCH AND NETWORK CONTROL SYSTEM USING THE METHOD

(71) Applicant: HUAWEI TECHNOLOGIES CO., LTD., Guangdong (CN)

(72) Inventors: Zhitang Chen, HongKong (CN); Fred Chi Hang Fung, Munich (DE); Yanhui Geng, Montreal (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/879,452

(22) Filed: Jan. 25, 2018

(65) Prior Publication Data

US 2018/0152386 A1 May 31, 2018

Related U.S. Application Data

(63) Continuation of application No. PCT/CN2016/095695, filed on Aug. 17, 2016.

(30) Foreign Application Priority Data

Aug. 22, 2015 (CN) .......................... 201510522003.6

(51) Int. Cl.
*H04L 12/851* (2013.01)
*H04L 12/753* (2013.01)
(Continued)

(52) U.S. Cl.
CPC .......... *H04L 47/2441* (2013.01); *H04L 45/48* (2013.01); *H04L 47/122* (2013.01);
(Continued)

(58) Field of Classification Search
CPC ..... H04L 47/2441; H04L 45/48; H04L 45/64; H04L 45/02; H04L 49/70
See application file for complete search history.

(56) References Cited

U.S. PATENT DOCUMENTS

| 2015/0026794 | A1 | 1/2015 | Zuk et al. |
| 2015/0039624 | A1* | 2/2015 | Chu ...................... G06F 16/285 707/740 |
| 2015/0200860 | A1* | 7/2015 | Kampeas .............. H04L 43/026 370/235 |

FOREIGN PATENT DOCUMENTS

| CN | 103179046 A | 6/2013 |
| CN | 103248573 A | 8/2013 |

(Continued)

OTHER PUBLICATIONS

Peng Xiao et al: "An efficient elephant flow detection with cost-sensitive SDN", 2015 1st International Conference on Industrial Networks and Intelligent Systems (INISCOM), ICST, Mar. 2, 2015, pp. 24-28 (Year: 2015).*

(Continued)

*Primary Examiner* — Walli Z Butt
*Assistant Examiner* — Thad N Defauw
(74) *Attorney, Agent, or Firm* — Leydig, Voit & Mayer, Ltd.

(57) ABSTRACT

A network data transmission method is provided. A switch device receives one or more data flows, classifies each of the received data flows into one of two classes according to data features of the data flow by using a decision tree model established by a flow table pipeline of the switch device. If a data flow belongs to a first class, the switch device reports the data flow to a controller, so that the controller computes a transmission path for the data flow. If a data flow belongs to a second class, the switch device obtains a transmission path for the data flow according to local flow table information, and transmits the data flow according to the obtained transmission path. Data flows are classified and filtered by (Continued)

using a switch, so as to improve network transmission efficiency while ensuring bearing capability of a network control system.

16 Claims, 5 Drawing Sheets

(51) Int. Cl.
  *H04L 12/931* (2013.01)
  *H04L 12/751* (2013.01)
  *H04L 12/715* (2013.01)
  *H04L 12/803* (2013.01)
  *H04L 12/24* (2006.01)

(52) U.S. Cl.
  CPC ............ *H04L 47/125* (2013.01); *H04L 49/70* (2013.01); *H04L 41/00* (2013.01); *H04L 45/02* (2013.01); *H04L 45/64* (2013.01)

(56) References Cited

FOREIGN PATENT DOCUMENTS

| CN | 104104718 A | 10/2014 |
|---|---|---|
| CN | 104158753 A | 11/2014 |
| CN | 104426762 A | 3/2015 |
| CN | 104579941 A | 4/2015 |
| CN | 104734957 A | 6/2015 |

OTHER PUBLICATIONS

Andrew R Curtis et al: "Mahout: Low-overhead datacenter traffic management using end-host based elephant detection", INFOCOM 2011 Proceedings IEEE, Apr. 10, 2011, pp. 1629-1637 (Year: 2011).*

Peng Xiao et al:"An efficient elephant flow detection with cost-sensitive in SDN",2015 1st International Conference on Industrial Networks and Intelligent Systems(INISCOM), ICST,Mar. 2, 2015 (Mar. 2, 2015),XP033175543,5 pages.

Andrew R Curtis et al:"Mahout: Low-overhead datacenter traffic management using end-host-based elephant detection",INFOCOM 2011 Proceedings IEEE,IEEE ,Apr. 10, 2011XP031953345,9 pages.

Justin A. Boyan et al. Packet Routing in Dynamically Changing Networks: A Reinforcement Learning Approach, NIPS Conference. 1994. total 8 pages.

D. Crocker, Ed et al. Augmented BNF for Syntax Specifications: ABNF, RFC2234, Nov. 1997. total 13 pages.

S. Bradner et al. Key words for use in RFCs to Indicate Requirement Levels, RFC2119. Mar. 1997. total 3 pages.

David Meyer et al. Recent Advances in Machine Learning and Their Application to Networking, IETF 93, Jul. 23, 2015. total 38 pages.

* cited by examiner

DATA TRANSMISSION METHOD, AND SWITCH AND NETWORK CONTROL SYSTEM USING THE METHOD

CROSS-REFERENCE TO RELATED APPLICATIONS

This application is a continuation of International Application No. PCT/CN2016/095695, filed on Aug. 17, 2016, which claims priority to Chinese Patent Application No. 201510522003.6, filed on Aug. 22, 2015. The disclosures of the aforementioned applications are hereby incorporated by reference in their entireties.

TECHNICAL FIELD

The present application relates to the field of data processing in a communications network, and in particular, to a data transmission method, and a switch device and a network control system that use the method.

BACKGROUND

A principal characteristic of a software-defined networking (SDN) network that makes itself different from a conventional distributed network is the separation between control plane and data plane. The SDN network mainly includes a central controller and a series of switches. The central controller is responsible for generating a control plane policy and delivering control commands, and has an overall network control capability. The switches are responsible for forwarding data flows in a data plane.

As shown in FIG. 1, because the central controller of the SDN network has overall network status information, theoretically, an optimal path may be selected by the central controller for each data flow according to a particular policy. The selection of an optimal path is implemented according to the following steps:

(1) A data flow enters a network, and reaches a first switch.

(2) The switch generates a packet-in event, and reports data flow information to the central controller.

(3) The central controller, based on the data flow information including a data flow header, generates an optimal route of the data flow according to a particular policy.

(4) The central controller delivers the path of the data flow to related switch(s), and configures a route forwarding table of the related switch(s).

In actual operations, quantity of data flows generated in a network is huge. For example, thousands of new data flows are generated per second in a small data center, and an amount of data traffic is much larger in a backbone network.

However, processing of each data flow requires two or more interactions between a controller and a switch. As a result, in one aspect, a control channel between a controller and a switch would be congested, causing a reduction of controlling efficiency of a network, and, in another aspect, a significant delay in flow forwarding may be caused, affecting quality of experience (QoE) of an application or a user.

Therefore, how to optimize a working policy of a switch and reduce temporary use of a communication resource between the switch and a controller to improve efficiency of the controller becomes a problem that needs to be resolved.

SUMMARY

Embodiments of the present application provide a data transmission method, and a switch and a network control system that use the method, so as to reduce interactions between a controller and a switch, and lighten load of communication between the controller and the switch, thereby improving control efficiency of the controller.

According to a first aspect, a data transmission method for recognizing a network sharing user is provided, including:

receiving, by a switch, data flows, where the switch is a switch in the OpenFlow protocol;

classifying the received data flows into two classes of data flows according to data features of the received data flows by using a decision tree model established by a flow table pipeline of the switch, where the decision tree model is obtained by training a data feature of a historical data flow and label information of the historical data flow, the decision tree model includes at least one decision node, each decision node includes one flow table of the flow table pipeline and performs matching on one data feature of the received data flows, to decide a splitting direction at a next node to distinguish between the two classes of data flows, and the label information indicates a class of a data flow;

reporting a first-class data flow of the two classes of data flows to a controller, so that the controller computes a transmission path of the first-class data flow; and determining a transmission path of a second-class data flow of the two classes of data flows according to local flow table information of the switch, and directly transmitting the second-class data flow according to the computed transmission path.

With reference to the first aspect, in a first implementation manner of the first aspect, the classifying the received data flows into two classes of data flows according to data features of the received data flows by using a decision tree model established by a flow table pipeline of the switch includes: inputting the data features of the data flows received by the switch into the decision tree model formed by the flow table pipeline, so that the data features of the received data flows reach leaf nodes of the decision tree model after matching and decision are performed according to a data flow feature corresponding to at least one decision node of the decision tree model when the data features of the received data flows pass the at least one decision node, where the leaf nodes include two classes of leaf nodes indicating the first-class data flow and the second-class data flow, respectively.

With reference to the first aspect or the first implementation manner of the first aspect, in a second implementation manner of the first aspect, the inputting the data features of the data flows received by the switch into the decision tree model formed by the flow table pipeline, so that the data features of the received data flows reach leaf nodes of the decision tree model after matching and decision are performed according to a data flow feature corresponding to at least one decision node of the decision tree model when the data features of the received data flows pass the at least one decision node includes: inputting the data features of the data flows received by the switch into the decision tree model formed by the flow table pipeline, so that matching is implemented by using a binary wildcard that is converted from a match field of a flow table corresponding to at least one decision node of the decision tree model when the data features of the received data flows pass the at least one decision node, where each decision node determines, according to a matching situation of the data feature and the binary wildcard of the match field of the corresponding flow table, a splitting direction to reach a next node along a connection between decision nodes, the connection between the nodes of the decision tree is implemented by a Go to Table n (go to a flow table n) instruction of an instruction field of the corresponding flow table, and classification is implemented until the leaf node.

With reference to the first aspect or the first implementation manner of the first aspect or the second implementation manner of the first aspect, in a third implementation manner of the first aspect, the data features of the data flows include at least one of a server IP address, a client IP address, a server port, a client port, or a network transmission protocol.

With reference to the first aspect or any one of the foregoing three implementation manners of the first aspect, in a fourth implementation manner of the first aspect, the first-class data flow is correspondingly a large data flow, a data flow of an application that has a high requirement for network quality, or a data flow that has a high importance level or a high priority, and the second-class data flow is correspondingly a small data flow, a data flow of an application that has a low requirement for network quality, or a data flow that has a low importance level or a low priority.

With reference to the first aspect or any one of the foregoing four implementation manners of the first aspect, in a fifth implementation manner of the first aspect, the decision tree model is sent to the switch after being trained or updated by the controller by using the data feature and the label information of the historical data flow that is received by the switch.

According to a second aspect, a switch is provided, where the switch is a switch in the OpenFlow protocol, and the switch includes:

a receiving module, configured to receive or transmit data flows through a network;

a decision module, configured to classify the received data flows into two classes of data flows according to data features of the received data flows by using a decision tree model established by a flow table pipeline of the switch, where the decision tree model is obtained by training a data feature of a historical data flow and label information of the historical data flow, the decision tree model includes at least one decision node, each decision node includes one flow table of the flow table pipeline and performs matching on one data feature of the received data flows, to decide a splitting direction at a next node to distinguish between the two classes of data flows, and the label information indicates a class of a data flow;

a reporting module, configured to report a first-class data flow of the two classes of data flows to a controller, so that the controller computes a transmission path of the first-class data flow; and a path allocation module, configured to determine a transmission path of a second-class data flow of the two classes of data flows according to local flow table information of the switch, and directly transmit the second-class data flow according to the computed transmission path.

According to a third aspect, a network control system is provided, including a switch and a controller, where the switch is a switch in the OpenFlow protocol, where the switch trains or updates a decision tree model by using a data feature and label information of a historical data flow that is received by the switch, where the label information indicates a class of a data flow; and the switch receives the decision tree model, and classifies received data flows into two classes of data flows according to data features of the received data flows by using the decision tree model established by a flow table pipeline of the switch, where the decision tree model includes at least one decision node, and each decision node includes one flow table of the flow table pipeline and performs matching on one data feature of the received data flows, to decide a splitting direction at a next node to distinguish between the two classes of data flows;

the switch reports a first-class data flow of the two classes of data flows to a controller, so that the controller computes a transmission path of the first-class data flow; and the switch determines a transmission path of a second-class data flow of the two classes of data flows according to local flow table information of the switch, and directly transmits the second-class data flow according to the computed transmission path.

According to a fourth aspect, a switch is provided, including a data interface configured to receive a data flow or forward a data flow according to a transmission path, a processor, a memory, and a bus, where the memory is configured to store a flow table pipeline, a decision tree model established by the flow table pipeline, and local flow table information;

the processor is connected to the memory in data transition through the bus, and is configured to classify, according to data features of received data flows, the received data flows into two classes of data flows by using the decision tree model, where the decision tree model is obtained by training a data feature of a historical data flow and label information of the historical data flow, the decision tree model includes at least one decision node, each decision node includes one flow table of the flow table pipeline and performs matching on one data feature of the received data flows, to decide a splitting direction at a next node to distinguish between the two classes of data flows, and the label information indicates a class of a data flow; and the data interface is configured to: report a first-class data flow of the two classes of data flows to a controller, so that the controller computes a transmission path of the first-class data flow; and determine a transmission path of a second-class data flow of the two classes of data flows according to the local flow table information of the switch, and directly transmit the second-class data flow according to the computed transmission path.

According to the data transmission method and the data transmission system using the method in the embodiments of the present application, data flows are mainly classified and filtered using a switch, and information of some data flows selected after classification is reported to a controller, so that the controller correspondingly selects, based on global information of a network, an optimal network transmission path, delivers the network transmission path to all switches on the path, and configures a route forwarding table. Therefore, some data flows do not need to be reported to the controller, thereby reducing interactions between the controller and the switches.

DESCRIPTION OF EMBODIMENTS

The technical solutions of the present application are further described in detail with reference to the accompanying drawings and embodiments below.

In the present application, to improve controlling effects of an SDN network, a balance needs to be reached between bearing capability of a network control system and utilization of overall network status information by a controller.

In the embodiments of the present application, by using a feature that a switch in the OpenFlow protocol can implement many distributed tasks, distributed processing is performed on data flows that reach the switch, thereby reducing interactions between the switch and a controller. In addition, the data flows can be classified and filtered by using the switch.

There are tens of thousands of data flows in a network, and the data flows have a variety of features. For example, from the perspective of a flow length, 90% of the data flows in the network are so-called "mouse" flows, that is, data flows that have very small flow lengths and short durations, and these flows have very little impact on the network. The rest 10% of the data flows are "elephant" flows, that is, data flows that have very large flow lengths and long durations. These elephant flows only account for 10% of the data flows, but account for 90% of overall network traffic. If elephant flows and mouse flows can be distinguished, and an optimal path that avoids collision with another elephant flow is selected for an elephant flow, network congestion can be greatly reduced, thereby optimizing performance of the entire network.

For another example, from the perspective of an application to which a data flow belongs, in a network, some data flows are sensitive to time delay and packet loss, for example, video flows, while other data flows belong to a data backup application and are not very sensitive to time delay or packet loss. Therefore, in the embodiments of the present application, data flows need to be classified, and planning of optimal path is performed on relatively important or sensitive data flows. Other data flows that are relatively not important or sensitive are directly forwarded by using switches, so as to reduce interactions between the switches and a controller, thereby improving network efficiency.

According to a data transmission method and a data transmission system using the method in the embodiments of the present application, data flows are classified and filtered by using a switch, and information of some data flows selected after the classification is reported to a controller. The controller correspondingly selects an optimal network transmission path for a data flow based on overall information of the network, delivers the network transmission path to all switches on the path, and configures a route forwarding table.

Figure 1:
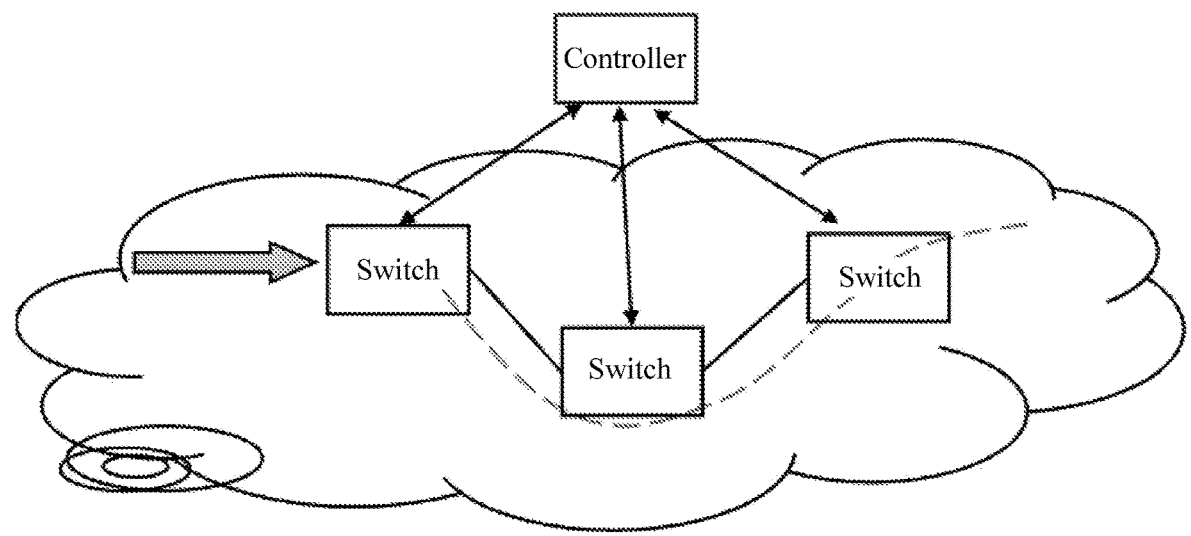
FIG. 1 is a schematic diagram of data flow controlling in an existing SDN network.
Figure 2:
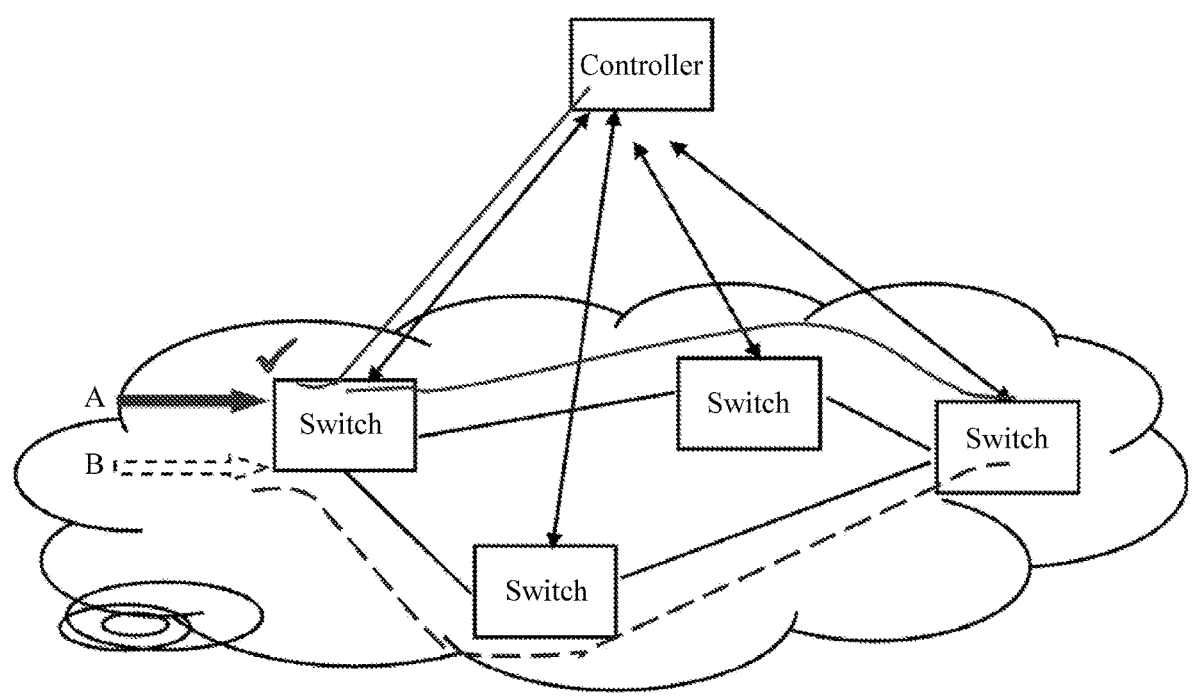
FIG. 2 is a schematic diagram of data flow transmission according to embodiments of the present application.

As shown in FIG. 2, according to a data transmission method and a data transmission system using the method, when data flows reach a switch, the data flows are classified and filtered by the switch, so that communication between a controller and the switch is minimized, and congestion of a control channel between the controller and the switch is greatly reduced.

However, the controller is a computer having a strong computing capability, and therefore a complex classifier algorithm can be implemented on the controller, while the switch is only a data forwarding device that has very limited or even no computing capability and does not have enough memory.

Therefore, in the embodiments of the present application, a classifier is implemented on a switch in the existing OpenFlow protocol, a decision tree is constructed by using a flow table and a flow table pipeline of the switch, and classification is performed by using the decision tree according to data features. A class A data flow is reported to a controller, so that the controller computes a transmission path of the data flow. For a class B data flow, the switch computes a transmission path of the data flow according to local flow table information of the switch, and the data flow is directly transmitted according to the computed transmission path. In this way, flow classification can be implemented by using the switch, and real-time updating of the decision tree can be supported by using the controller. The data features that are used by the switch to perform classification by using the decision tree include but are not limited to: a server IP address, a client IP address, a server port, a client port, and a network transmission protocol. In addition, application scenarios of the embodiments of the present application are not limited to an SDN network. The present application can be used as long as a switch in a network is a switch in the OpenFlow protocol.

Embodiment 1

Figure 3:
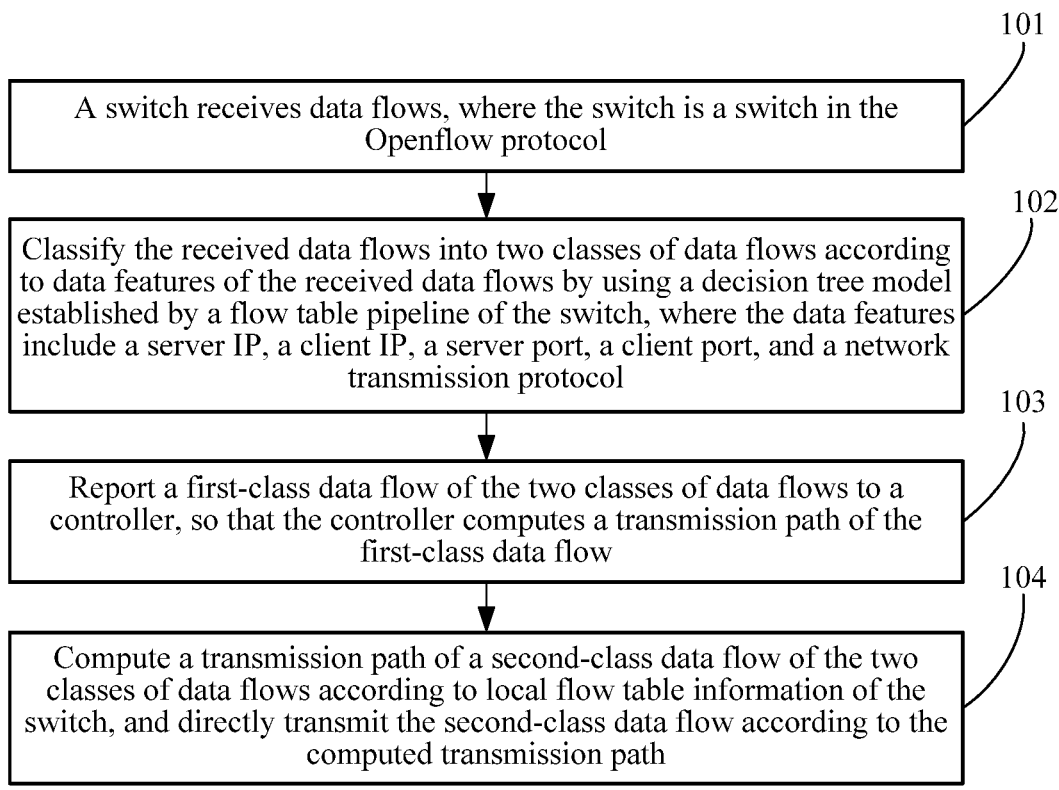
FIG. 3 is a flowchart of a data transmission method according to embodiment 1 of the present application.

Referring to FIG. 2 and FIG. 3, a data transmission method in this embodiment of the present application mainly includes the following steps:

Step 101: A switch receives data flows, where the switch is a switch in the OpenFlow protocol.

Step 102: The switch classifies the received data flows into two classes of data flows according to data features of the received data flows by using a decision tree model established by a flow table pipeline of the switch. The decision tree model is obtained by training a data feature of a historical data flow and label information of the historical data flow. The decision tree model includes at least one decision node. Each decision node includes one flow table of the flow table pipeline. The switch performs matching on one data feature of the received data flows, to decide a splitting direction at a next node to distinguish between the two classes of data flows. The label information indicates a class of a data flow, and the data features include a server IP address, a client IP address, a server port, a client port, and a network transmission protocol.

Step 103: The switch reports a first-class data flow of the two classes of data flows to a controller, so that the controller computes a transmission path of the first-class data flow.

Step 104: The switch determines a transmission path of a second-class data flow of the two classes of data flows according to local flow table information of the switch, and directly transmits the second-class data flow according to the computed transmission path.

Before the step 102, the switch receives the decision tree model from the controller. The decision tree model is sent to the switch after the controller completes training of an initial decision tree model or updates a current decision tree model by using data information of a historical data flow in a network server. The data information of the historical data flow includes the data feature and the label information of the historical data flow. If the switch has relatively strong computing and storage capabilities, the switch may train or update a decision tree model according to historical data that is stored in the switch or acquired from the network server, and then the decision tree model that is trained or updated is applied to a classification operation in the step 102.

In the step 102, the switch classifying the received data flows into two classes of data flows may include classifying, according to the data features of the received data flows, the received data flows into two classes of data flows that have different sizes, application types, or importance levels and priorities. Depending on sizes of the data flows, the received data flows may be classified into elephant flows and mouse flows. An elephant flow is a first-class data flow and needs to be reported to the controller. A mouse flow is a second-class data flow and may be directly forwarded by the switch according to information. Alternatively, according to different application types of the two classes of data flows, the received data flows may be classified into data flows of applications that have a high requirement for network service quality and data flows of applications that have a middle or low requirement for network service quality. For example, a video flow is relatively sensitive to network quality, time delay, and packet loss rate. It should be classified as the first-class data flow, and needs to be reported to the controller. Some data flows belong to data backup applications. They are not sensitive to network quality, delay rate, and packet loss rate, and should be classified as second-class data flows and may be directly forwarded by the switch according to local information. Alternatively, according to importance levels of the two classes of data, the received data flows may be classified into important data and unimportant data. For example, a data flow that is labeled as important or labeled with a relatively high priority should be classified as the first-class data flow and needs to be reported to the controller. Some common data and data having a relatively low priority should be classified as the second-class data flow, and may be directly forwarded by the switch according to local information or forwarded after an optimal route is computed according to collected topological information.

The switch may forward the second-class data flows according to an equal-cost multi-path (ECMP) routing table. As of how the switch collects topological information of a network and computes an optimal route based on the collected topological information, there are mainly two routing algorithms: a global routing algorithm and a distributed routing algorithm. The distributed routing algorithm is generally referred to as a distance vector algorithm. In this algorithm, each switch has only information of a switch that is directly connected to the switch, and does not have information of other switches in a network. The global routing algorithm is generally referred to as a link status algorithm, and each switch has all information of all switches in a network. Main steps of the global routing algorithm include: (1) confirming switches that are physically and directly connected to the switch and acquiring IP addresses of the switches; (2) measuring a time delay or another important network parameter of an adjacent router; (3) broadcasting information of the switch to other switches in the network, and at the same time, receiving information of the other switches; (4) determining an optimal route between two nodes in the network by using a proper algorithm, such as a Dijkstra algorithm. In addition, the local flow table information in step 104 refers to routing information recorded in a flow table except a flow table that is used to construct a decision tree model.

In the step 102, the decision tree model includes a decision tree, and in the foregoing data transmission method, classification of the data flows received by the switch is mainly implemented by using the decision tree. The switch inputs the data features of the data flows received by it into the decision tree model formed by the flow table pipeline. When the data features of the received data flows reach a decision node of the decision tree model, matching and decision making are performed according to data flow features corresponding to the decision node. The data features of the data flows finally reach leaf nodes of the decision tree model after passing though at least one decision node of the decision tree model. The leaf nodes include two classes of leaf nodes which corresponds to the first-class data flow and the second-class data flow, respectively. The leaf node is an end node of the decision tree.

Figure 4:
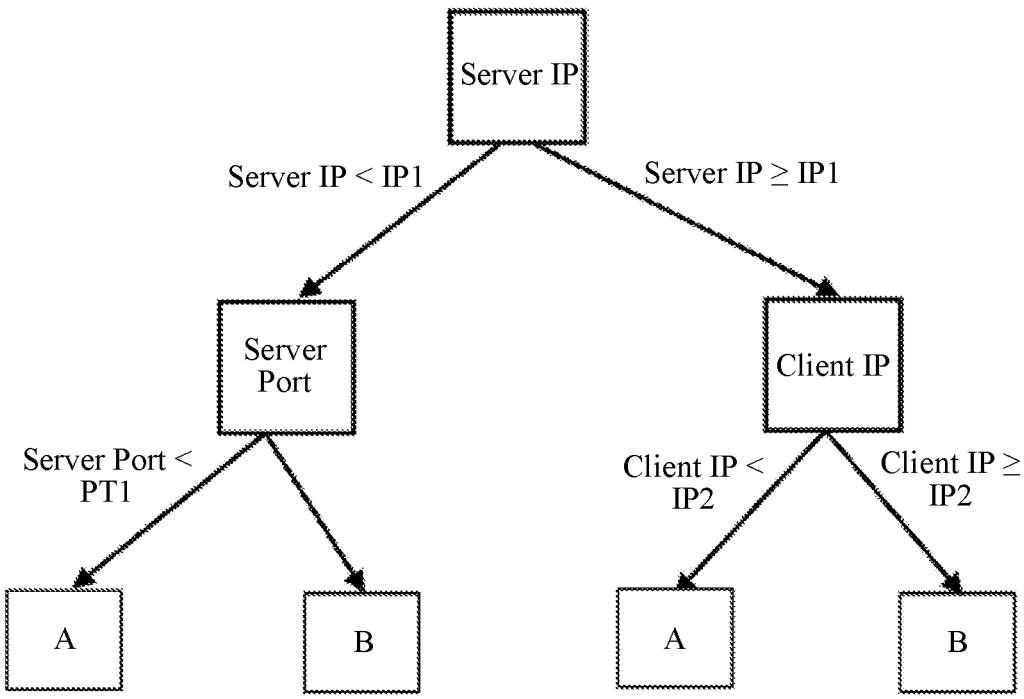
FIG. 4 is a schematic diagram of a decision tree according to embodiments of the present application.

As shown in FIG. 4, the decision tree is established by the flow table pipeline of the switch. A node of the decision tree corresponds to a flow table of the flow table pipeline. The node processes a data feature of the data flows, decides a splitting direction of the node according to a matching situation of each data feature of the data flows and a flow table corresponding to a node at which the data feature is located. For a node splitting condition for deciding a splitting direction of a current node of the decision tree, a splitting direction may be determined by means of threshold comparison. The determining may be implemented by using a binary wildcard of a match field of a corresponding flow table. That is, the splitting direction of the current node is determined according to a matching situation of the data feature and the binary wildcard of the match field of the corresponding flow table, so that the node is connected to a next node along a left side or a right side of nodes of the decision tree. Connection between the nodes of the decision tree, that is, connection from the current node to the next node, is implemented by using a Go to Table n (going to a flow table n) instruction in an instruction field of the corresponding flow table. Finally, classification is implemented until a flow table corresponding to a leaf node.

Figure 5:
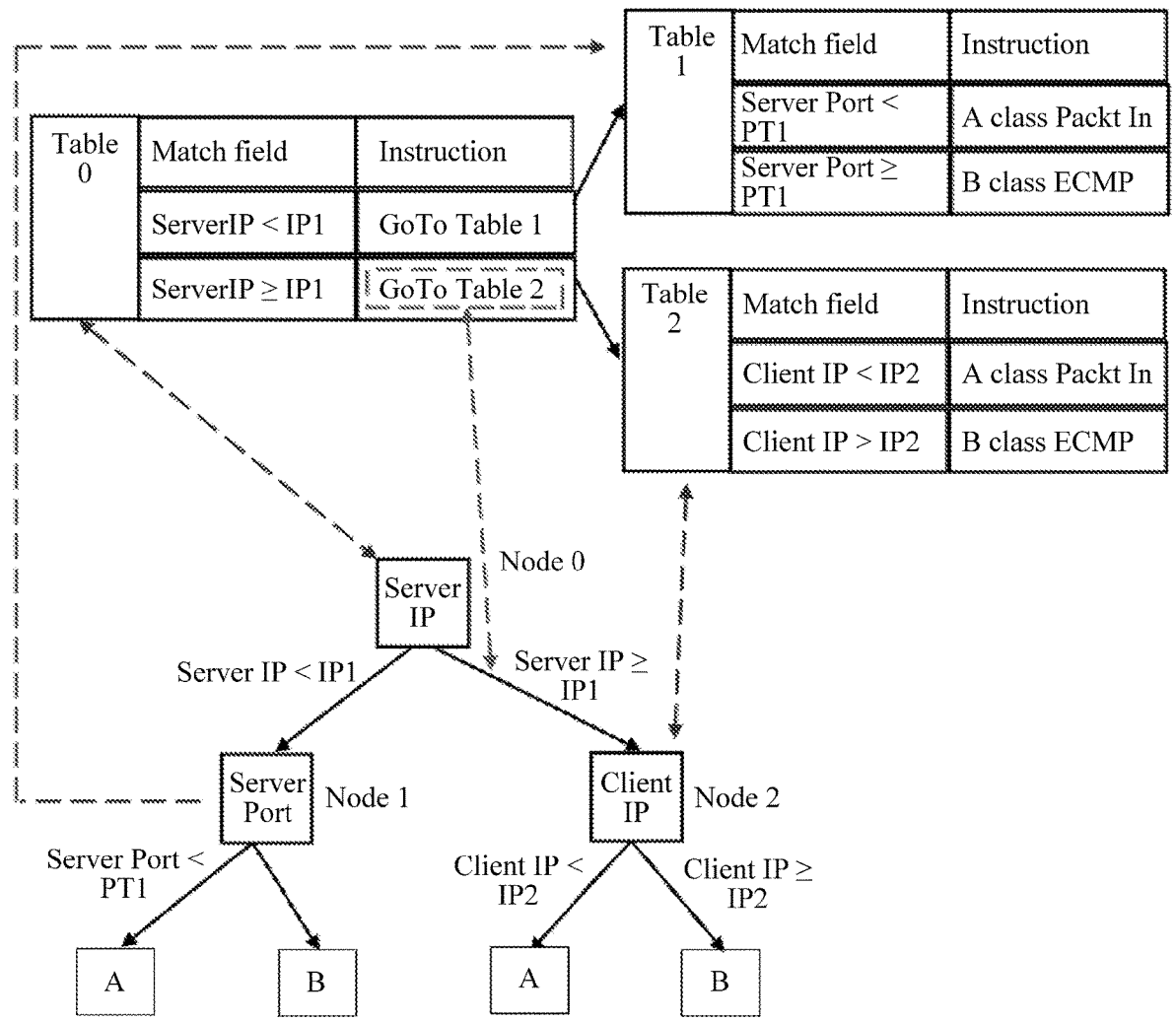
FIG. 5 is another schematic diagram of a decision tree according to embodiments of the present application.

As shown in FIG. 5, each data feature corresponds to one node of the decision tree and one flow table of the flow table pipeline. For example, in the figure, a node 0 corresponds to a server IP address and corresponds to a flow table 0 (Table 0), a node 1 corresponds to a server port and corresponds to a flow table 1 (Table 1), and a node 2 corresponds to a client port and corresponds to a flow table 2 (Table 2).

The decision tree splits at each node according to a value of a variable of a data feature corresponding to the node. As shown in FIG. 5, when an IP address of a source end server is less than IP1, a decision process branches to the left to reach a next node. Or, when an IP address of a source end server is greater than IP1, a decision process branches to the right. A similar process is repeated until reaching leaf nodes at the lowest layer of the decision tree, that is, a classification result is obtained after a multi-layer decision process of multiple nodes. The leaf nodes at the lowest layer have an A class or a B class, and correspond to the first-class data flow and the second-class data flow in step 102, respectively.

In a specific implementation of the decision and determining of the decision tree, the flow table and the flow table pipeline of the switch are data structures having decision processes, for example, a data structure of a flow table shown in the following Table 1:

TABLE 1

| Match Fields | Priority | Counters | Timeouts | Flags |
|---|---|---|---|---|
| xxxxxxxx | xxxxxxxx | xxxxxxxx | xxxxxxx | xxxxxxx |
| xxxxxxxx | xxxxxxxx | xxxxxxxx | xxxxxxx | xxxxxxx |
| xxxxxxxx | xxxxxxxx | xxxxxxxx | xxxxxxx | xxxxxxx |

Each row of the foregoing flow table is a flow table unit, and represents a decision rule. For example, the first column of the flow table is a match field, the fourth column of the flow table is an instruction, and a combination of the match field and the instruction embodies a decision process. That is, if there is a successful match for an item in a match field of a flow table unit, an instruction of the flow table unit is executed. Therefore, a flow table and match fields and instructions of the flow table are functionally consistent with a node of a decision tree and a branch of the node, and therefore a node of a decision tree is implemented by using a flow table.

A flow table pipeline is implemented based on a flow table by using a switch. For a data flow, a series of decision processes may be implemented by using a flow table pipeline. Connection between flow tables of the flow table pipeline is established by means of Go to-Table n in an instruction. In a flow table at an end of the flow table pipeline, an instruction does not include Go to-Table n, but instead includes a specific operation, for example, an operation of directly reporting the data flow to a controller through a port of the switch, or an operation of sending the data flow back to a network through a port. In this embodiment, the instruction directly includes classification information A or B of the data flows, that is, the first-class data flow or the second-class data flow.

It can be seen from the foregoing that a node of a decision tree splits according to a value of a variable of a data feature of the node, to form different sub-trees of the decision tree. In determining of the feature variable, matching and determining may be implemented by means of a match field of a flow table and a series of wildcards, to determine a splitting direction.

For example, at a node of a decision tree, a data feature of a data flow is converted into a 32-bit binary string, and matching and determining are performed by means of the following:

If 38798<=Server Port<=56637, go to node (Table) XXX.

In a flow table, matching and determining may be implemented in a match field of the flow table by using a wildcard in the following Table 2.

TABLE 2

| Match field * | Instruction |
|---|---|
| 100101111000111* | Goto Table XXX |
| 1001011111** | |
| 100101111*1***** | |
| 1001011111****** | |
| 10011*********** | |
| 101************* | |
| 110111010011110* | |
| 1101110100*0 | |
| 11011101000* | |
| 1101110100*0**** | |
| 11011101000***** | |
| 11011100******** | |
| 1100******** | |
| 110*0*********** | |
| 1100************ | |

The table shows a data feature, for example, a 32-bit binary string of a Server Port, of a data flow. Other data features of a data flow may also be converted into binary, and then decision of a splitting direction of a decision tree node corresponding to each data feature may be implemented by means of matching and determining. A process of converting the data features into binary wildcards may be implemented by using the following pseudocode:

Assuming that a data feature indicated by a data packet header is F, an algorithm that converts a determining algorithm $R: V_u \geq F \geq V_l$ F into a binary wildcard is as follows:
1. Initialize F to a binary form of a lower bound $V_l$.
2. Start from the rightmost end of F.
3. Search for an all-0 fragment.
4. Set all binary bits of a right end of the all-0 fragment to wildcards '*'.
5. Generate N new matching rules, where N is a length of the all-0 fragment.
6. In each rule, set a bit '0' of the all-0 fragment to '1', and set other bits of the all-0 fragment to '*'.
7. Return to step 2 until a generated new matching rule is greater than an upper bound $V_u$.

A conversion rule of the upper bound is similar to the foregoing algorithm, and an only difference is to search for an all-1 fragment '1 . . . 1' and change a bit to '0'.

Embodiment 2

Figure 6:
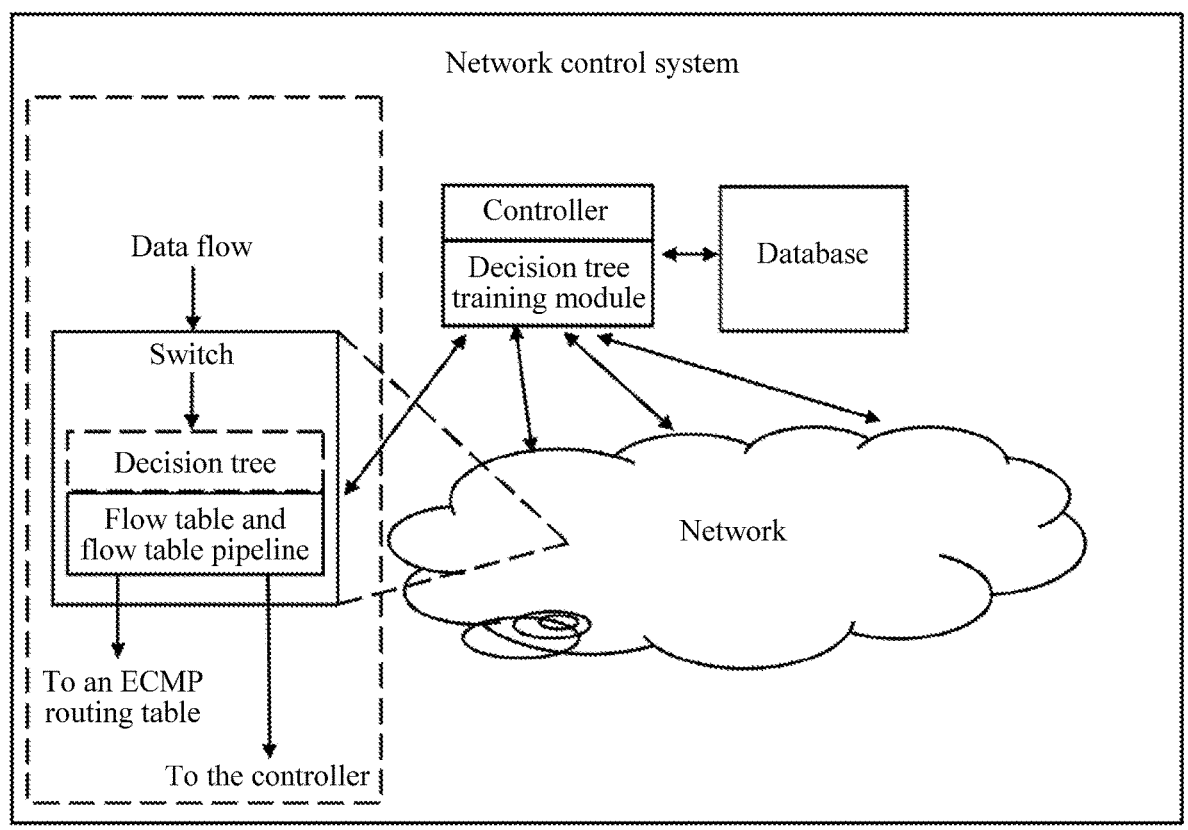
FIG. 6 is a simplified block diagram of a network control system according to embodiment 2 of the present application.

As shown in FIG. 6, a network control system in Embodiment 2 of the present application includes a switch, a controller, and a database. The network controller is suitable for an SDN network. However, the present application is not limited to the SND network. The network controller is suitable for data transmission networks in which switches meet requirements of the OpenFlow protocol.

The controller trains or updates a decision tree model by using data features and label information of a historical data flow that is received by the switch, where the label information indicates a class of a data flow.

The switch receives the decision tree model, and classifies received data flows into two classes of data flows according to data features of the received data flows by using the decision tree model established by a flow table pipeline of the switch. The decision tree model includes at least one decision node, and each decision node includes one flow table of the flow table pipeline and performs matching on one data feature of the received data flows, to decide a splitting direction at a next node to distinguish between the two classes of data flows.

The switch reports a first-class data flow of the two classes of data flows to a controller, so that the controller computes a transmission path of the first-class data flow.

The switch determines a transmission path of a second-class data flow of the two classes of data flows according to local flow table information of the switch, and directly transmits the second-class data flow according to the computed transmission path.

The switch includes:
a receiving module, configured to receive data flows through a network;
a decision module, configured to classify the received data flows into two classes of data flows according to data features of the received data flows by using a decision tree model established by a flow table pipeline of the switch. The decision tree model is obtained by training a data feature of a historical data flow and label information of the historical data flow. The decision tree model includes at least one decision node. Each decision node includes one flow table of the flow table pipeline and performs matching on one data feature of the received data flows, to decide a splitting direction at a next node to distinguish between the two classes of data flows, and the label information indicates a class of a data flow;

a reporting module, configured to report a first-class data flow of the two classes of data flows to a controller, so that the controller computes a transmission path of the first-class data flow; and a path allocation module, configured to determine a transmission path of a second-class data flow of the two classes of data flows according to local flow table information of the switch, and directly transmit the second-class data flow according to the computed transmission path.

Before classifying the received data flows, the switch needs to finish training or updating of a decision tree model. The switch may internally implement training or updating of the decision tree model, or may receive the decision tree model sent by the controller. The decision tree model is sent to the switch after the controller finishes training or updating of the decision tree model by using data information of the historical data flow that is received by a controller in a database, where the data information of the historical data flow includes a data feature and label information of the historical data flow.

The decision module is configured to input the data features of the data flows received by the switch into the decision tree model formed by the flow table pipeline. The data features of the received data flows reach leaf nodes of the decision tree model after matching and decision are performed according to a data flow feature corresponding to at least one decision node of the decision tree model when the data features of the received data flows pass the at least one decision node. The leaf nodes include two classes of leaf nodes indicating the first-class data flow and the second-class data flow, respectively.

The decision module is further configured to input the data features of the data flows received by the switch into the decision tree model formed by the flow table pipeline. Matching is implemented by using a binary wildcard that is converted from a match field of a flow table corresponding to at least one decision node of the decision tree model when the data features of the received data flows pass the at least one decision node. Each decision node determines, according to a matching situation of the data feature and the binary wildcard of the match field of the corresponding flow table, a splitting direction to reach a next node along a connection between decision nodes. The connection between the nodes of the decision tree is implemented by a Go to Table n (go to a flow table n) instruction of an instruction field of the corresponding flow table, and classification is implemented until the leaf node.

Embodiment 3

Figure 7:
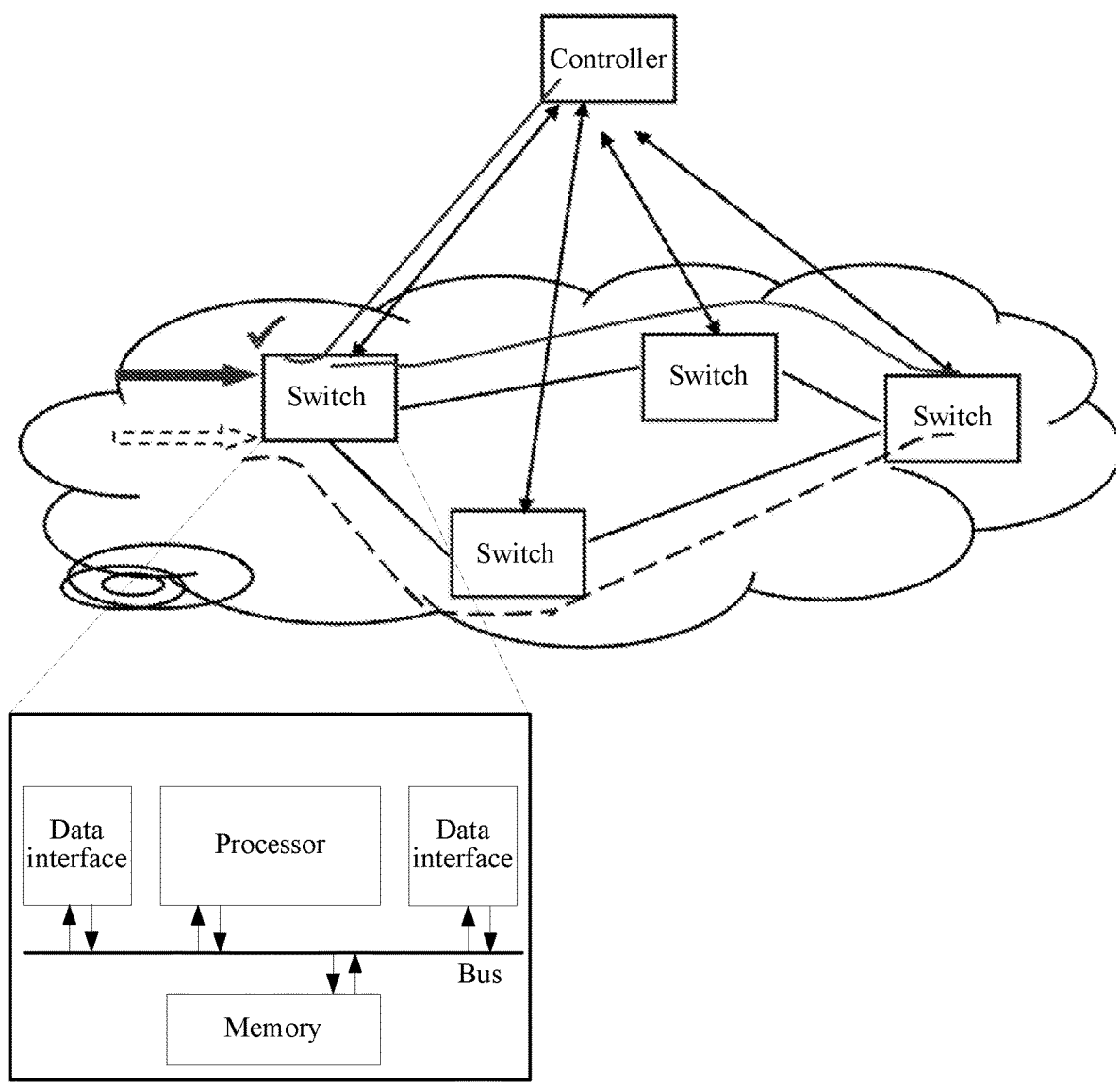
FIG. 7 is a simplified block diagram of a switch according to embodiment 3 of the present application.

As shown in FIG. 7, a switch in Embodiment 3 of the present application includes a data interface, a processor, a memory, and a bus. The data interface is configured to receive data flows or forward data flows according to a transmission path.

The memory is configured to store a flow table pipeline, a decision tree model established by the flow table pipeline, and local flow table information.

The processor is connected to the memory and the data interface through the bus, and is configured to classify the received data flows into two classes of data flows according to data features of the received data flows by using the decision tree model. The decision tree model is obtained by training a data feature of a historical data flow and label information of the historical data flow. The decision tree model includes at least one decision node. Each decision node includes one flow table of the flow table pipeline and performs matching on one data feature of the received data flows, to decide a splitting direction at a next node to distinguish between the two classes of data flows, and the label information indicates a class of a data flow.

The data interface reports a first-class data flow of the two classes of data flows to a controller. The controller computes a transmission path of the first-class data flow, determines a transmission path of a second-class data flow of the two classes of data flows according to the local flow table information of the switch, and directly transmits the second-class data flow according to the computed transmission path.

A data flow classification method and a working manner of a decision model that are involved in the network control system in Embodiments 2 and 3 of the present application are consistent with the data transmission method in Embodiment 1, and details are not described herein again.

In the foregoing specific implementation manners, the objectives, technical solutions, and beneficial effects of the present application are further described in detail. It should be understood that the foregoing descriptions are merely specific implementation manners of the present application, but are not intended to limit the protection scope of the present application. Any modifications, equivalent replacements, or improvements made without departing from the principle of the present application should fall within the protection scope of the present application.

What is claimed is:

1. A method for routing data flows in a network, comprising:

receiving, by a switch device of the network, a data flow to be transmitted to a remote destination;

classifying, by the switch device, the data flow into one of two classes according to data features of the data flow by using a decision tree model, wherein the decision tree model is established in a flow table pipeline of the switch device by training using data features of one or more historical data flows and classification information of the historical data flows, and wherein the data features of the data flow utilized to classify the data flow into one of the two classes include one or more of a server IP address, a client IP address, a server port, a client port, and a network transmission protocol; and responsive to determining that the data flow belongs to a first class, reporting, by the switch device, the data flow to a controller of the network, receiving a transmission path computed by the controller, and transmitting the data flow according to the transmission path computed by the controller; or responsive to determining that the data flow belongs to a second class, determining, by the switch device, a transmission path for the data flow according to local flow table information, and transmitting the data flow according to the determined transmission path;

wherein the decision tree model comprises one or more decision nodes, and each decision node comprises one flow table of the flow table pipeline; and wherein classifying the data flow into one of two classes using the decision tree model comprises:

at each decision node, matching one data feature of the data flow with the flow table at the decision node, to determine a splitting direction to a next node.

2. The method according to claim 1, wherein the decision tree model further comprises a plurality of leaf nodes, each leaf node corresponding to the first class or the second class, wherein the data features of the data flow reach a leaf node after passing through the one or more decision nodes where the data features of the data flow are matched with the flow tables at the decision nodes, and the data flow is classified according to the classification of the leaf node.

3. The method according to claim 1, wherein the classification of the data flow into one of two classes is based on one or more thresholds of the data features,
wherein a first-class data flow is a data flow with a large amount of data, a data flow of an application that has a high requirement for network quality, or a data flow that has a high importance level or a high priority, and
wherein a second-class data flow is a data flow with a small amount of data, a data flow of an application that has a low requirement for network quality, or a data flow that has a low importance level or a low priority.

4. The method according to claim 1, wherein the decision tree model is established and updated by the controller by training using data features of one or more historical data flows and classification information of the historical data flows received by the switch device, and wherein the method further comprises:
receiving, by the switch device, the established or updated decision tree model from the controller.

5. The method according to claim 1, wherein the switch device meets requirements of OpenFlow protocol.

6. The method according to claim 2, wherein classifying the data flow into one of two classes using the decision tree model comprises:
inputting the data features of the data flow to the decision tree model; and
at each decision node that receives the data features of the data flow, matching a data feature corresponding to the decision node with a binary wildcard that is converted from a match field of a flow table corresponding to the decision node, and determining, according to a matching result between the data feature and the binary wildcard, the splitting direction to the next node connected to the decision node;
wherein the connection between nodes of the decision tree model is indicated by a "Go to Table n" instruction in an instruction field of the flow table, and wherein the classification of the data flow is performed node by node until the data features reach a leaf node.

7. A switch device in a network, comprising a processor and a non-transitory medium storing program instructions, wherein the program instructions, when executed by the processor, cause the switch device to:
receive a data flow to be transmitted to a remote destination;
classify the data flow into one of two classes according to data features of the data flow by using a decision tree model, wherein the decision tree model is established in a flow table pipeline of the switch device by training using data features of one or more historical data flows and classification information of the historical data flows, and wherein the data features of the data flow utilized to classify the data flow into one of the two classes include one or more of a server IP address, a client IP address, a server port, a client port, and a network transmission protocol;
responsive to determining that the data flow belongs to a first class, report the data flow to a controller of the network, receive a transmission path computed by the controller, and transmit the data flow according to the transmission path computed by the controller; or
responsive to determining that the data flow belongs to a second class, determine a transmission path for the data flow according to local flow table information, and transmit the data flow according to the determined transmission path:
wherein the decision tree model comprises one or more decision nodes, and each decision node comprises one flow table of the flow table pipeline; and wherein in classifying the data flow into one of two classes using the decision tree model, the program instructions cause the switch device to:
at each decision node, match on one data feature of the data flow with the flow table at the decision node, to determine a splitting direction to a next node.

8. The switch device according to claim 7, wherein the decision tree model further comprises a plurality of leaf nodes, each leaf node corresponding to the first class or the second class, wherein the data features of the data flow reach a leaf node after passing through the one or more decision nodes, where the data features of the data flow are matched with the flow tables at the decision nodes, and the data flow is classified according to the classification of the leaf node.

9. The switch device according to claim 7, wherein the classification of the data flow into one of two classes is based on one or more thresholds of the data features,
wherein a first-class data flow is a data flow with a large amount of data, a data flow of an application that has a high requirement for network quality, or a data flow that has a high importance level or a high priority, and
wherein a second-class data flow is a data flow with a small amount of data, a data flow of an application that has a low requirement for network quality, or a data flow that has a low importance level or a low priority.

10. The switch device according to claim 7, wherein the decision tree model is established and updated by the controller by training using data features of one or more historical data flows and classification information of the historical data flows received by the switch device, and wherein the processor, by executing the program instructions, further causes the switch device to:
receive the established or updated decision tree model from the controller.

11. The switch device according to claim 7, wherein the switch device meets requirements of OpenFlow protocol.

12. The switch device according to claim 8, wherein in classifying the data flow into one of two classes using the decision tree model, the processor is configured to:
input the data features of the data flow to the decision tree model; and
at each decision node that receives the data features of the data flow, match a data feature corresponding to the decision node with a binary wildcard that is converted from a match field of a flow table corresponding to the decision node, and determine, according to a matching result between the data feature and the binary wildcard, the splitting direction to the next node connected to the decision node;
wherein the connection between nodes of the decision tree model is indicated by a "Go to Table n" instruction in an instruction field of the flow table, and wherein the classification of the data flow is performed node by node until the data features reach a leaf node.

13. A control system in a network, comprising a switch device and a controller, wherein the switch device is configured to:
- receive a data flow to be transmitted to a remote destination;
  - classify the data flow into one of two classes according to data features of the data flow by using a decision tree model, wherein the decision tree model is established in a flow table pipeline of the switch device by training using data features of one or more historical data flows and classification information of the historical data flows, and wherein the data features of the data flow utilized to classify the data flow into one of the two classes include one or more of a server IP address, a client IP address, a server port, a client port, and a network transmission protocol; and
  - responsive to determining that the data flow belongs to a first class, report the data flow to the controller, receive a transmission path computed by the controller, and transmit the data flow according to the transmission path computed by the controller; or
  - responsive to determining that the data flow belongs to a second class, determine a transmission path for the data flow according to local flow table information, and transmit the data flow according to the determined transmission path;
  - wherein the decision tree model comprises one or more decision nodes, and a plurality of leaf nodes each corresponding to the first class or the second class, and each decision node comprises one flow table of the flow table pipeline; wherein in classifying the data flow into one of two classes using the decision tree model, the switch device is configured to:
    - at each decision node, match one data feature of the data flow with the flow table at the decision node, to determine a splitting direction to a next node;

and wherein the controller is configured to:
receive information of the first class data flow reported by the switch device; compute the transmission path for the first class data flow; and send the transmission path for the first class data flow to the switch device.

14. The control system according to claim 13, wherein the data features of the data flow reach a leaf node after passing through the one or more decision nodes, and the data flow is classified according to a classification of the leaf node.

15. The control system according to claim 13, wherein the classification of the data flow into one of two classes is based on one or more thresholds of the data features,
- wherein a first-class data flow is a data flow with a large amount of data, a data flow of an application that has a high requirement for network quality, or a data flow that has a high importance level or a high priority, and
- wherein a second-class data flow is a data flow with a small amount of data, a data flow of an application that has a low requirement for network quality, or a data flow that has a low importance level or a low priority.

16. The control system according to claim 13, wherein the switch device meets requirements of OpenFlow protocol.

* * * * *

UNITED STATES PATENT AND TRADEMARK OFFICE
CERTIFICATE OF CORRECTION

| | | |
|---|---|---|
| PATENT NO. | : 11,159,432 B2 | Page 1 of 1 |
| APPLICATION NO. | : 15/879452 | |
| DATED | : October 26, 2021 | |
| INVENTOR(S) | : Chen et al. | |

It is certified that error appears in the above-identified patent and that said Letters Patent is hereby corrected as shown below:

On the Title Page

Item (71): "HUAWEI TECHNOLOGIES CO., LTD., Guangdong (CN)" should read -- HUAWEI TECHNOLOGIES CO., LTD., Shenzhen (CN) --.

Signed and Sealed this
Seventh Day of June, 2022

Katherine Kelly Vidal
*Director of the United States Patent and Trademark Office*